United States Patent
Horstman et al.

(10) Patent No.: US 12,535,774 B2
(45) Date of Patent: Jan. 27, 2026

(54) ENVIRONMENTALLY ISOLATED INTERCALATED COMPOUND MOUNT

(71) Applicant: Honeywell International Inc., Charlotte, NC (US)

(72) Inventors: Luke Horstman, Saint Louis Park, MN (US); Chad Fertig, Roseville, MN (US); Caleb Sjoquist, Clearwater, FL (US); Argyrios Dellis, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 11 days.

(21) Appl. No.: 18/642,409

(22) Filed: Apr. 22, 2024

(65) Prior Publication Data
US 2025/0328111 A1  Oct. 23, 2025

(51) Int. Cl.
*G04F 5/14* (2006.01)
*G01N 27/407* (2006.01)
*H03B 17/00* (2006.01)
*H03L 7/26* (2006.01)

(52) U.S. Cl.
CPC .......... *G04F 5/14* (2013.01); *G01N 27/4074* (2013.01); *H03B 17/00* (2013.01); *H03L 7/26* (2013.01)

(58) Field of Classification Search
CPC ............ G01N 27/407; G01N 27/4073; G01N 27/4074; G04F 5/14; G04F 5/145; H03B 17/00; H03L 7/26; H05H 3/02
USPC .................................................. 331/3, 94.1
See application file for complete search history.

(56) References Cited

U.S. PATENT DOCUMENTS

| | | | |
|---|---|---|---|
| 10,509,370 B1 * | 12/2019 | Lemke | G04F 5/14 |
| 10,545,461 B1 | 1/2020 | Roper et al. | |
| 10,775,748 B1 | 9/2020 | Roper et al. | |
| 11,101,809 B1 | 8/2021 | Roper | |
| 11,849,532 B1 * | 12/2023 | Roper | H05H 3/02 |
| 2016/0209351 A1 * | 7/2016 | Oba | G01N 27/4062 |
| 2019/0215945 A1 * | 7/2019 | Amini | H05H 3/02 |
| 2024/0114611 A1 * | 4/2024 | Tsuji | G04F 5/14 |

FOREIGN PATENT DOCUMENTS

| | | |
|---|---|---|
| CN | 101677662 B | 3/2012 |
| FR | 3126782 A1 | 3/2023 |

OTHER PUBLICATIONS

Martinez et al., "A chip-scale atomic beam clock", Nature Communications, 14:3501, Jun. 13, 2023, pp. 1 through 7.
McGrew et al., "Atomic clock performance beyond the geodetic limit", Nature, Nov. 28, 2018, vol. 564, No. 87-90, pp. 1 through 32.

(Continued)

*Primary Examiner* — Levi Gannon
(74) *Attorney, Agent, or Firm* — Fogg & Powers LLC

(57) ABSTRACT

A mounting apparatus for suspending an intercalated compound includes spring connectors that couple to an intercalated complex that comprises the intercalated compound in an enclosure. The spring connectors exert spring forces on the intercalated complex that cause it to be suspended between the spring connectors during operation. In doing so, the intercalated compound is thermally isolated relative to the exterior of the enclosure it is disposed in. The mounting apparatus can be used as part of an atomic clock sensor.

20 Claims, 10 Drawing Sheets

(56) References Cited

OTHER PUBLICATIONS

European Patent Office, "Extended European Search Report", dated Jul. 15, 2025, from EP Application No. 25155890.4, from Foreign Counterpart to U.S. Appl. No. 18/642,409, pp. 1 through 7, Published: EP.

* cited by examiner

ENVIRONMENTALLY ISOLATED INTERCALATED COMPOUND MOUNT

STATEMENT REGARDING FEDERALLY SPONSORED RESEARCH OR DEVELOPMENT

This invention was made with Government support under N00014-22-C-1043 awarded by Navy. The Government has certain rights in the invention.

BACKGROUND

Atomic clocks utilize the frequency excitations of sourced atoms as a reference clock signal. An intercalated compound may be used to source atoms (for example, Rubidium atoms) in an atomic clock. Such a compound includes a lattice structure that can be doped when exposed to the sourced atoms in favorable reaction conditions. Hence, an intercalated compound operates by chemically emitting or absorbing the sourced atoms, depending on the surrounding concentration of sourced atoms and temperature. These chemical reactions are reversible in chemical equilibrium, enabling use of an intercalated compound to control the access of sourced atoms in the atomic clock.

The maintenance of a high operating temperature for the intercalated compound requires large amounts of electrical power so that the compound is mounted in a way that insulates it from cold environments. High electric power consumption is disadvantageous for compact, portable atomic clocks operating on battery power.

Accordingly, a need exists for improving the performance of compact, portable atomic clocks utilizing sourced atoms.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of any patents, applications and publications as identified herein to provide yet further embodiments.

In one embodiment, a system is disclosed. The system comprises a first cover, a first heating element physically coupled with the first cover, a second cover, and a second heating element physically coupled with the second cover. The system further comprises an intercalated compound in contact with the first heating element and the second heating element and coupled in between the first cover and the second cover. The system further comprises a first spring connector coupled with the first cover at a first end of the first spring connector, and a second spring connector coupled with the second cover at a first end of the second spring connector. The system further comprises a coupler attached to an exterior of a mounting interface device. The coupler couples to both the first spring connector at a second end of the first spring connector and at a second end of the second spring connector. The intercalated compound is suspended between the first cover and the second cover at least partially due to a spring force exerted by the first spring connector and the second spring connector. The system transitions between a closed configuration and an open configuration. In the closed configuration, the spring force exerted by the first spring connector and the second spring connector causes the first cover and the second cover to substantially enclose the intercalated compound. In the open configuration, expansion of the intercalated compound exerts a force on the first spring connector and the second spring connector and causes increased exposure of the intercalated compound to an exterior environment relative to the closed configuration. By suspending the intercalated compound, the intercalated compound is thermally insulated relative to the exterior environment.

In another embodiment, a device is disclosed. The device comprises an intercalated complex. The intercalated complex comprises a first cover, a first heating element physically coupled with the first cover, a second cover, a second heating element physically coupled with the second cover, and an intercalated compound in contact with the first heating element and the second heating element and coupled in between the first cover and the second cover. The device comprises a mounting apparatus that physically couples to the intercalated complex. The mounting apparatus comprises a first spring connector coupled with the first cover at a first end of the first spring connector, a second spring connector coupled with the second cover at a first end of the second spring connector, and a coupler attached to an exterior of a mounting interface device. The coupler couples to both the first spring connector at a second end of the first spring connector and at a second end of the second spring connector. The intercalated compound is suspended between the first cover and the second cover at least partially due to a spring force exerted by the first spring connector and the second spring connector.

In yet another embodiment, a method for fabricating a mounting apparatus for an intercalated compound is disclosed. The method comprises attaching a first end of a first spring connector and a first end of a second spring connector to a mounting interface device. The method comprises attaching a second end of the first spring connector to a first cover. The method comprises attaching a second end of the second spring connector to a second cover. The method comprises coupling a first and a second heating element in a cavity formed by the first cover and the second cover. The method comprises suspending an intercalated compound between the first heating element and the second heating element and between the first cover and the second cover.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as subsequently described and in conjunction with the detailed description.

Figure 1:
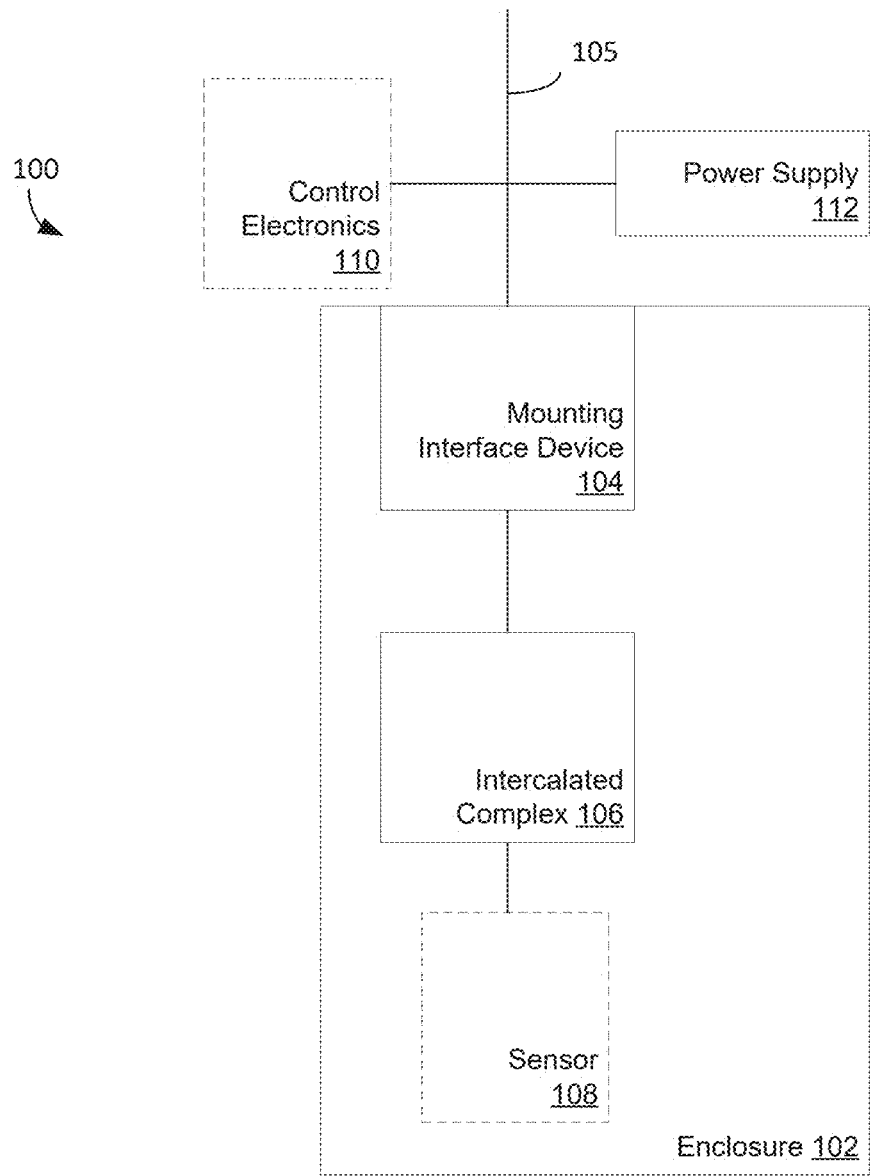
FIG. 1 depicts a block diagram of a system with an intercalated complex in which the techniques described herein can be utilized.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, any methods presented in the drawing figures and the specification are not to be construed as limiting the order in which the individual steps may be performed. The following detailed description is, therefore, not to be taken in a limiting sense.

FIG. 1 depicts a block diagram of a system 100 with an intercalated complex in which the techniques described herein can be utilized. In various embodiments, system 100 is or includes an atomic clock sensor, though this disclosure is not limited to atomic clock applications. System 100 includes an enclosure 102 that comprises a volume for sourced atoms to form a vapor. Specifically, the mounting apparatus comprises an intercalated complex 106 physically and electrically coupled to a mounting interface device 104. The enclosure 102 generally creates a contained, high vacuum environment surrounding intercalated complex 106 and can isolate the intercalated complex 106 from external circuits and systems, such as power supply 112, optional control electronics 110, and any other external system that couples to the system 100 shown in FIG. 1.

Intercalated complex 106 includes a source of atoms that is used for an atomic clock. As is understood by one of ordinary skill, an atomic clock generally operates by using electromagnetic radiation to excite a vapor of atoms, such as Rubidium atoms. An observation of an excitation resonance frequency can then be used as a reference for defining a stable clock signal, which can be used for various applications in timing, navigation, and sensing. Such applications can be advantageous when implemented in the context of aerial navigation. Accordingly, system 100 can be coupled to a vehicle, such as an aircraft. In some embodiments, enclosure 102 comprises a vacuum environment notwithstanding the sourced atoms that chemically interact with intercalated complex 106.

Intercalated complex 106 includes an intercalated compound that supplies the sourced atoms. For example, the intercalated compound can include graphite (i.e., a graphite intercalated compound (GIC)) or other similar material that can bond with sourced atoms. The intercalated compound is characterized by a series of intercalated layers (for example, graphite sheets) that under certain conditions, chemically react with sourced atoms in a reversible chemical reaction. For example, to source the atoms, the intercalated compound is exposed to a low concentration environment, and heated, which allows the sourced atoms to escape the intercalated compound and into the interior of the enclosure 102, where the atomic vapor can be excited by electromagnetic interactions. In conditions where a high concentration of sourced atoms is present in the enclosure 102, sourced atoms can react with the intercalated compound, which decreases the concentration of sourced atoms in the environment of the enclosure 102. Specifically, the sourced atoms can become bonded (covalently or ionically, depending on the intercalated compound used) in between the layers of the host compound.

In some embodiments, the intercalated complex 106 includes heating elements that provide heat to the intercalated compound. Such heating elements (see FIG. 6B) can be powered by power supply 112, through electrical connections, conductors, or other means. Enclosure 102 also optionally includes a sensor 108. In some embodiments, sensor 108 is a temperature sensor that monitors the temperature of the walls of the enclosure 102. Additionally, or alternatively, sensor 108 is a sensor that monitors the concentration of sourced atoms in the enclosure 102. In embodiments, where sensor 108 is used, the measurements determined by sensor 108 can be provided to control electronics 110, to be used for feedback in controlling the temperature of the intercalated complex 106. For example, control electronics 110 may control exposure of the intercalated compound based on the temperature of the walls of enclosure 102 and/or concentration of sourced atoms detected by sensor 108. This provides an active mechanism of regulating the supply of sourced atoms in the enclosure 102. However, in some embodiments, passive atomic vapor regulation mechanisms can be used without active control of the intercalated complex 106. Therefore, control electronics 110 and sensor 108 are optional. Control and power signals from control electronics 110 and power supply 112 and provided from bus 105, which can also connect these components to external systems.

Intercalated complex 106 is physically coupled to a mounting interface device 104. Mounting interface device 104 electrically couples the control electronics 110 and power supply 112 to the mounting apparatus, and physically couples to the mounting apparatus, as subsequently described.

In the embodiments disclosed herein, the intercalated complex 106 is thermally isolated from the walls of the enclosure 102. This permits the temperature of the intercalated complex 106 to be maintained at a higher temperature than the walls of the enclosure, while requiring only minimal electrical power for heating. Various embodiments of mounting apparatus (and its constituent components) used to isolate the intercalated complex 106 will be described with respect to FIGS. 2-10.

Figure 2:
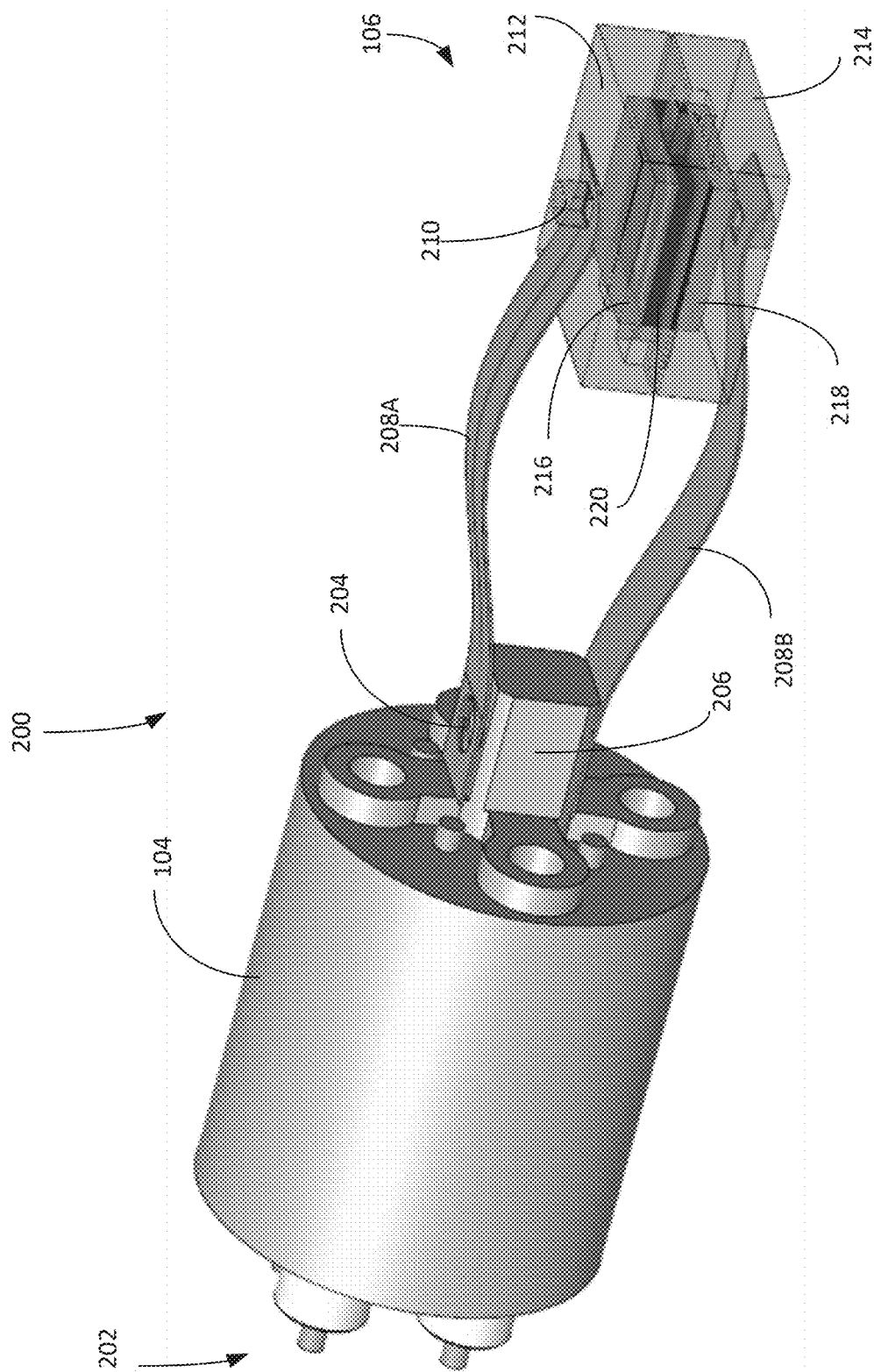
FIG. 2 depicts a block diagram of an exemplary mounting apparatus for isolating an intercalated compound, as described in one or more embodiments.

FIG. 2 depicts a diagram of a mounting apparatus 200 for isolating an intercalated compound. Mounting apparatus 200 generally includes a set of spring connectors 208A, 208B, physically coupled with intercalated complex 106. Each spring connector 208A, 208B is configured to couple to a coupler 206 of mounting interface device 104. Various coupling mechanisms can be used to couple the spring connectors 208A, 208B, including nuts, bolts, screws, and the like. In some embodiments, spring connectors 208A, 208B can be coupled to coupler 206 by adhesion, snapping mechanisms, grooves, or other indentations on the coupler 206 that fix the spring connectors 208A, 208B to the mounting interface device 104. In the embodiment of FIG. 2, each spring connector 208A, 208B is coupled to coupler 206 via a screw 204 inserted into a hole at the end of the connector 208A, 208B.

The mounting interface device 104 can couple to an interior wall of the enclosure 102 (not shown in FIG. 2) and the mounting interface device 104 and the mounting apparatus 200 can be in a high vacuum environment. The intercalated complex 106 comprising the intercalated compound 220 can protrude further inside the enclosure 102. Electrical leads 202 extend out from the enclosure 102 to power supply 112 and/or control electronics 110, and can electrically couple the mounting interface device 104 to these and other systems via bus 105.

On the other end of the spring connectors 208A, 208B is the intercalated complex 106. Intercalated complex 106 comprises an intercalated compound 220 coupled in between two covers 212, 214, and two planar heaters 216 and 218. Covers 212, 214 are then respectively coupled to one of the spring connectors 208A, 208B, where cover 212 couples to spring connector 208A while cover 214 couples to spring connector 208B. In the embodiment of FIG. 2, each cover 212, 214 includes a nub 210 that protrudes outward from the cover 212, 214 and is inserted through a hole on the spring connector 208A, 208B. Covers 212, 214 capture the intercalated compound 220 and heaters 216, 218 together into an oven-like assembly. Spring connectors 208 thermally isolate the intercalate complex from the mounting interface, and also permit the expansion and contraction of the thickness of intercalated compound 220 that occurs as sourced atoms are emitted and absorbed during operation.

In coupling the intercalated complex 106 between two spring connectors 208A, 208B, the intercalated complex 106 remains suspended so that it does not contact the walls of enclosure 102 or any other platform. The mechanics of the coupling between the spring connectors 208A, 208B, and the intercalated complex 106 will now be described as follows. Spring connectors 208A, 208B are configured to apply an opposing spring force (though not necessarily equal in magnitude) to intercalated complex 106, which keeps the intercalated complex 106 suspended between each spring connector 208A, 208B. In the embodiment in FIG. 2, spring connector 208A applies a spring force on the cover 212. However, spring connector 208B also applies a counteracting spring force on cover 214. The tension between the spring force exerted by connector 208A and the spring force exerted by connector 208B causes the net force on intercalated complex 106 to remain balanced, and hence, suspended in between the two connectors 208A, 208B.

In some embodiments, the intercalated complex 106 is held fixed simply by the counteracting spring forces exerted by spring connectors 208A, 208B. In the coupling configuration shown in FIG. 2, the intercalated compound 220 and the planar heaters 216, 218 are held in place by the spring forces acting on the two covers 212, 214. As further described in FIGS. 8-10, the intercalated compound 220 is free to expand and contract in thickness as it emits or absorbs atoms, in order to regulate the density of the vapor of sourced atoms in the surrounding environment. In suspending the intercalated complex 106 between the two spring connectors 208A, 208B, the intercalated complex 106 can function as an atomic source.

Figure 3:
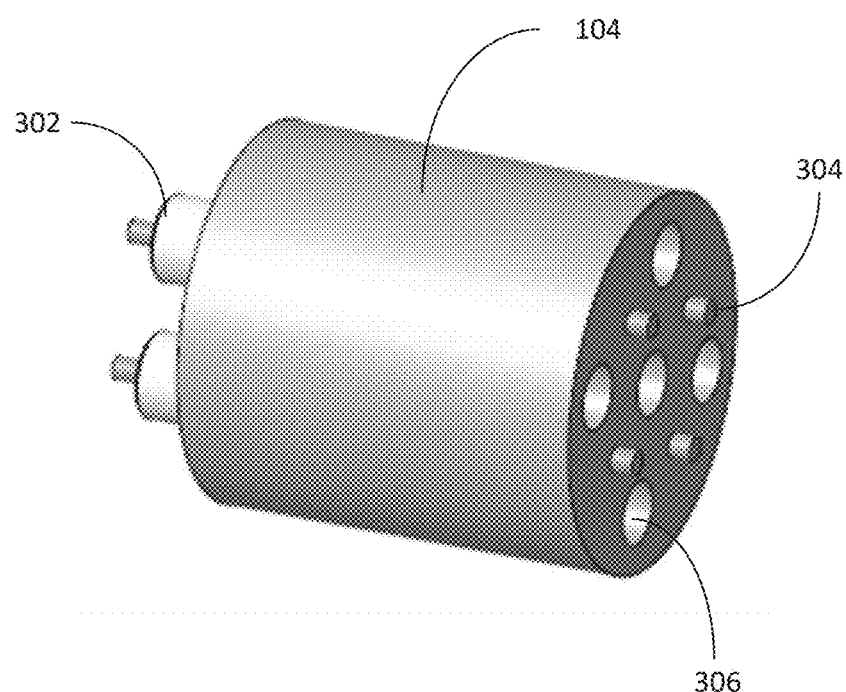
FIG. 3 depicts an isometric view of an exemplary mounting interface device used in connection with the mounting apparatus, as described in one or more embodiments.

FIG. 3 depicts an isometric view of a mounting interface device used for the mounting apparatus. Mounting interface device 104 includes an exterior surface with an interior (not shown) inside the exterior surface. Connected to the interior of the mounting interface device 104 are electrical leads 302 that electrically couple the mounting apparatus 200 to external systems that are located on the aircraft (e.g., power supply 112 and/or control circuitry 110). In some embodiments, mounting interface device 104 interfaces between different environmental partitions. For example, one end of mounting interface device 104 (the end that includes electrical leads 302) is exposed to air while the other end of mounting interface device 104 (the end that includes electrical leads 304) is disposed in a vacuum enclosure 102 in which the sourced atoms can proliferate. Electrical leads 304 electrically couple power received from external sources (e.g. power supply 112) to the planar heaters 216 and 218 in the intercalated complex 106.

The interior of mounting interface device 104 couples the electrical leads 302, 304 together. In some embodiments, the interior of the mounting interface device 104 is otherwise empty except for the electrical leads 304, 304. The mounting interface device 104 can be welded to the walls of the enclosure 102. In some embodiments, the mounting interface device 104 can be designed in other ways that stabilize and physically couple the mounting apparatus in the enclosure 102.

Figure 4:
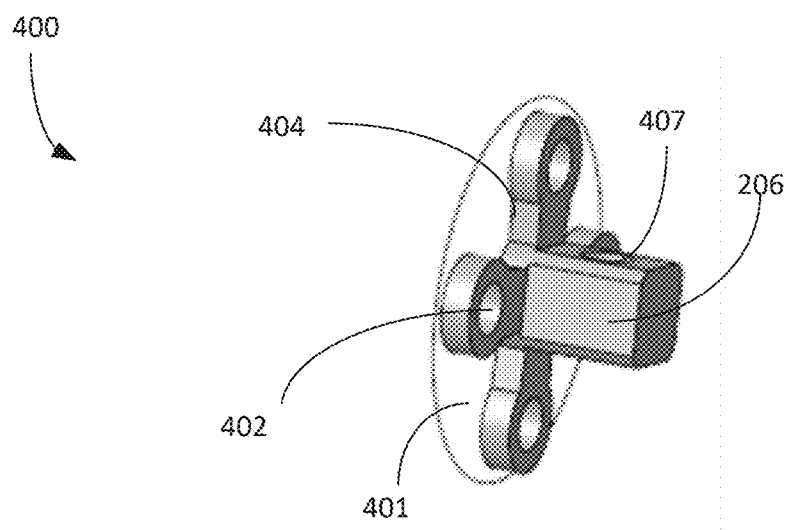
FIG. 4 depicts an isometric view of an exemplary coupler used for coupling an intercalated complex to the mounting interface device, as described in one or more embodiments.

FIG. 4 depicts an isometric view of a coupler 400 used for coupling an intercalated complex to the mounting interface device 104. Coupler 400 is configured to be attached to mounting interface device 104, for example, by adhesive, welding, or external couplers such as screws, bolts, etc. Coupler 400 includes a protrusion 206 that couples to the spring connectors 208A, 208B shown in FIG. 2. In the embodiment shown in FIG. 4, the coupler includes four members 404; each member 404 attaches flush to a surface 401 of the mounting interface device 104. Specifically, each member 404 includes a hole 402 in which a coupling device such as a screw or nut can be inserted through to couple to a reciprocated hole 306 on the surface 401 of the mounting interface device 104. Coupler 400 can be composed of a metal, ceramic, glass, or other sturdy material sufficient to handle the opposing spring forces of the spring connectors 208A, 208B and couple these connectors to the mounting interface device 104. Coupler 400 can in some embodiments form part of mounting interface device 104 by being permanently fixed to the surface 401, e.g., as part of the fabrication process. While FIG. 4 depicts one embodiment of a coupler 400, the coupler 400 can be designed in other ways than as depicted in FIG. 4.

Figure 5:
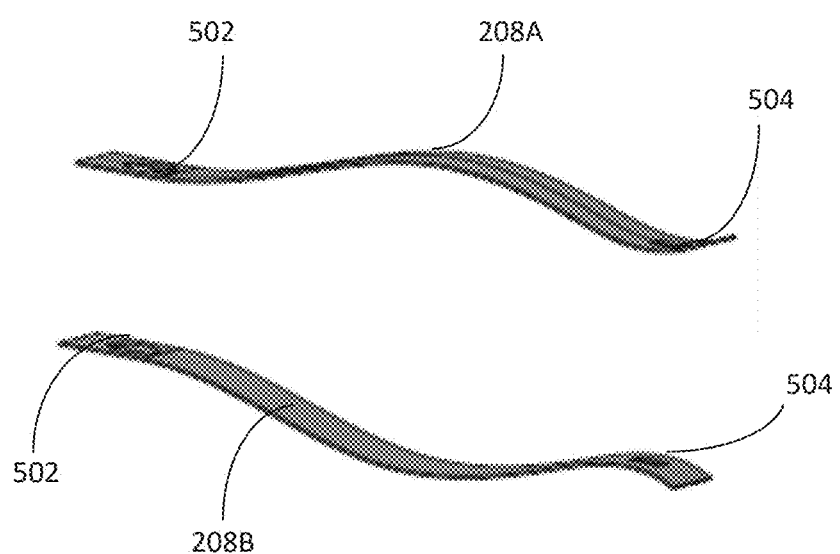
FIG. 5 depicts an isometric view of exemplary spring connectors used for coupling the intercalated complex to the mounting interface device, as described in one or more embodiments.

FIG. 5 depicts an isometric view of spring connectors 208A, 208B, used for coupling the intercalated complex to the chamber. As noted with respect to FIG. 2, each spring connector 208A, 208B, couples to the coupler 206. In some embodiments, each spring connector 208A, 208B includes a hole 502 in which a coupling device such as a screw or bolt can be inserted through the hole 502. For example, to couple each spring connector 208A, 208B to the coupler 206, the hole 502 of the spring connector 208A, 208B is aligned to either a top or bottom hole 407 of the coupler 206. Specifically, the hole 502 of spring connector 208A can be aligned on the top hole 407 while the hole 502 of spring connector 208B can be aligned on a corresponding bottom hole (not shown in FIG. 4) of the coupler 206. Then one or more screws can be inserted through the top and bottom holes 407 to fasten the spring connectors 208A, 208B to the coupler 206.

Spring connectors 208A, 208B also include a hole 504 on the opposite end to couple the spring connectors 208A, 208B to the intercalated complex 106. For example, each hole 504 can couple to a respective cover 212, 214, by inserting the nub of 210 of each cover 212, 214 through the respective holes 504. Additionally, each spring connector 208A, 208B is made of a flexible or elastic material that generates a spring force when stressed. In the example shown in FIG. 5, each spring connector 208A, 208B can be slightly arched at the midpoint to facilitate the generation of a spring force when coupled to the coupler 206 and the intercalated complex 106. In some embodiments, spring connectors 208A, 208B may be made of a material with low thermal conductivity, such as stainless steel, so as to reduce heat conduction from the intercalated complex 106 to the mount. The shape of the spring connectors 208A, 208B can be chosen such that they exert the appropriate amount of force to maintain compression and stability without yielding or damaging the inner layers of the intercalated complex 106, which varies based on the type of material, length of the spring, and shock/vibe requirements.

Figure 6A:
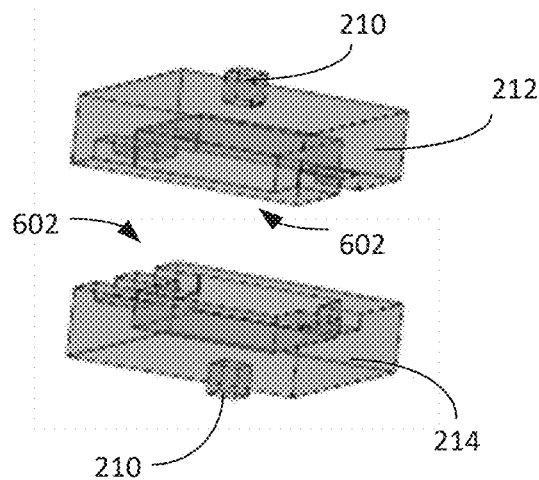
FIGS. 6A-6B depict isometric views of exemplary components used in an intercalated complex, as described in one or more embodiments.
Figure 6B:
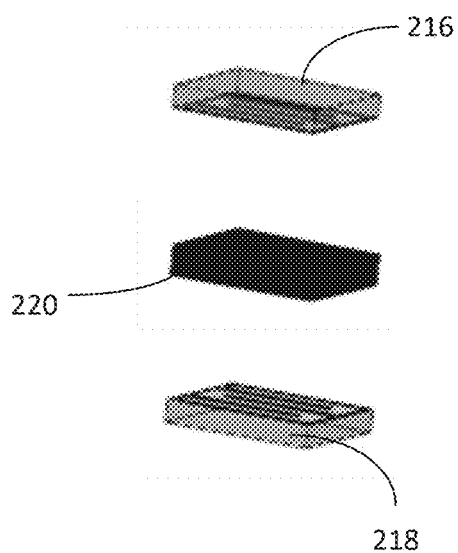

FIGS. 6A-6B depict an isometric view of components used in an intercalated complex. Specifically, FIG. 6A depicts an embodiment of the covers that at least partially contain the intercalated compound, while FIG. 6B depicts an embodiment of the internal components of the intercalated complex 106. Referring to FIG. 6A, each cover 212, 214 includes a respective nub 210 disposed on the exterior surface of the cover. The nub 210 is configured to coupled to a hole 504 of the respective spring connector 208A, 208B. In the embodiment depicted in FIG. 5, hole 504 of spring connector 208A engages with nub 210 of cover 212, and hole 504 of spring connector 208B engages with nub 210 of cover 214. However, the coupling between the covers 212, 214 and the spring connectors 208A, 208B can be done in other ways. For example, the covers 212, 214 may include etches, grooves, latches, or other indentations on the surface that engage with the spring connectors 208A, 208B. The nub 210 of each cover 212, 214 should closely match the dimensions of the respective hole 504 to hold each cover 212, 214 in place, and the coupling mechanism between the spring connector 208A, 208B and the covers 212, 214 should be designed so that the covers 212, 214 are oriented flush with respect to each other (as opposed to being slanted or arched).

The interior of each cover 212, 214 includes a cavity 602 in which the interior components (see FIG. 6B) can be disposed therein. The cavity 602 can be specially designed with the dimensions matching the spatial dimensions of the interior components. In some embodiments, each cover 212, 214 includes openings where electrical connections to power supply 112 can couple to the heating elements 216 disposed in the cavity 602.

Referring to FIG. 6B, one or more heating elements can be disposed in the intercalated complex 106 to provide heat to the intercalated compound. For example, two planar heating elements 216, 218 are shown in FIG. 6B. Each heating element 216, 218 can be rectangular in design and can include thermistors or other heating circuitry. Intercalated compound 220 comprises a material with a plurality of intercalated layers. In favorable reaction conditions, it acts as a sink or source for atoms such as Rubidium. Sourced atoms react with the host atoms and become chemically bonded with these atoms, thereby increasing the concentration of sourced atoms in the compound 220. Bonding the sourced atoms to the intercalated layers also causes the compound 220 to expand. When conditions favor release of the sourced atoms, the chemical bonds between the sourced atoms and the intercalated layers break, allowing the soured atoms to escape from the intercalated compound 220. Hence, the thickness of the compound 220 can change as a function of the concentration of sourced atoms in the intercalated compound.

The intercalated compound 220 can include any intercalated material that can react with atoms to be sourced, such as Rubidium. In one embodiment, the intercalated compound 220 is a graphite intercalated with rubidium atoms, but other intercalation host materials besides graphite can also be used, and other atoms besides Rubidium can be intercalated, and sourced.

Figure 7:
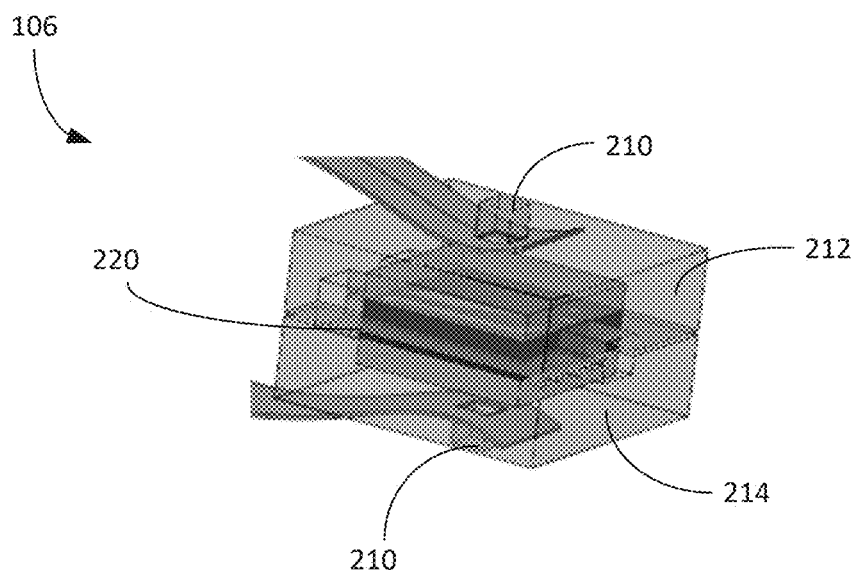
FIG. 7 depicts an isometric view of an exemplary intercalated complex, as described in one or more embodiments.

FIG. 7 depicts an isometric view of an intercalated complex 106, comprising the components described in FIGS. 6A-6B. Generally, the intercalated complex 106 is coupled together with the opposing spring forces exerted by spring connectors 208A, 208B. As previously and subsequently described, the thickness (the distance between covers 212, 214) of the intercalated complex 106 can vary as the intercalated compound 220 absorbs or releases sourced atoms. Although the thickness varies, in some embodiments the covers 212, 214 do not physically touch, and even when the intercalated compound 220 is at a minimum thickness, there is still a gap between cover 212 and cover 214. As the intercalated compound 220 expands, the spacing between cover 212 and cover 214 increases. As the intercalated compound 220 contracts, the spacing between cover 212 and cover 214 decreases. Thus, positive mechanical capture of the internal components of the intercalated complex 106 is maintained even as the thickness of the intercalated compound 220 changes during operation.

As shown in FIG. 7, the intercalated compound 220 is sandwiched between two heating elements 216, 218. The heating elements 216, 218 can be attached to the inside of each respective cover 212, 214, and/or can be in contact with the intercalated compound 220. The sandwich of heating elements 216, 218 and intercalated compound 220 is further coupled between the two covers 212, 214.

Figure 8:
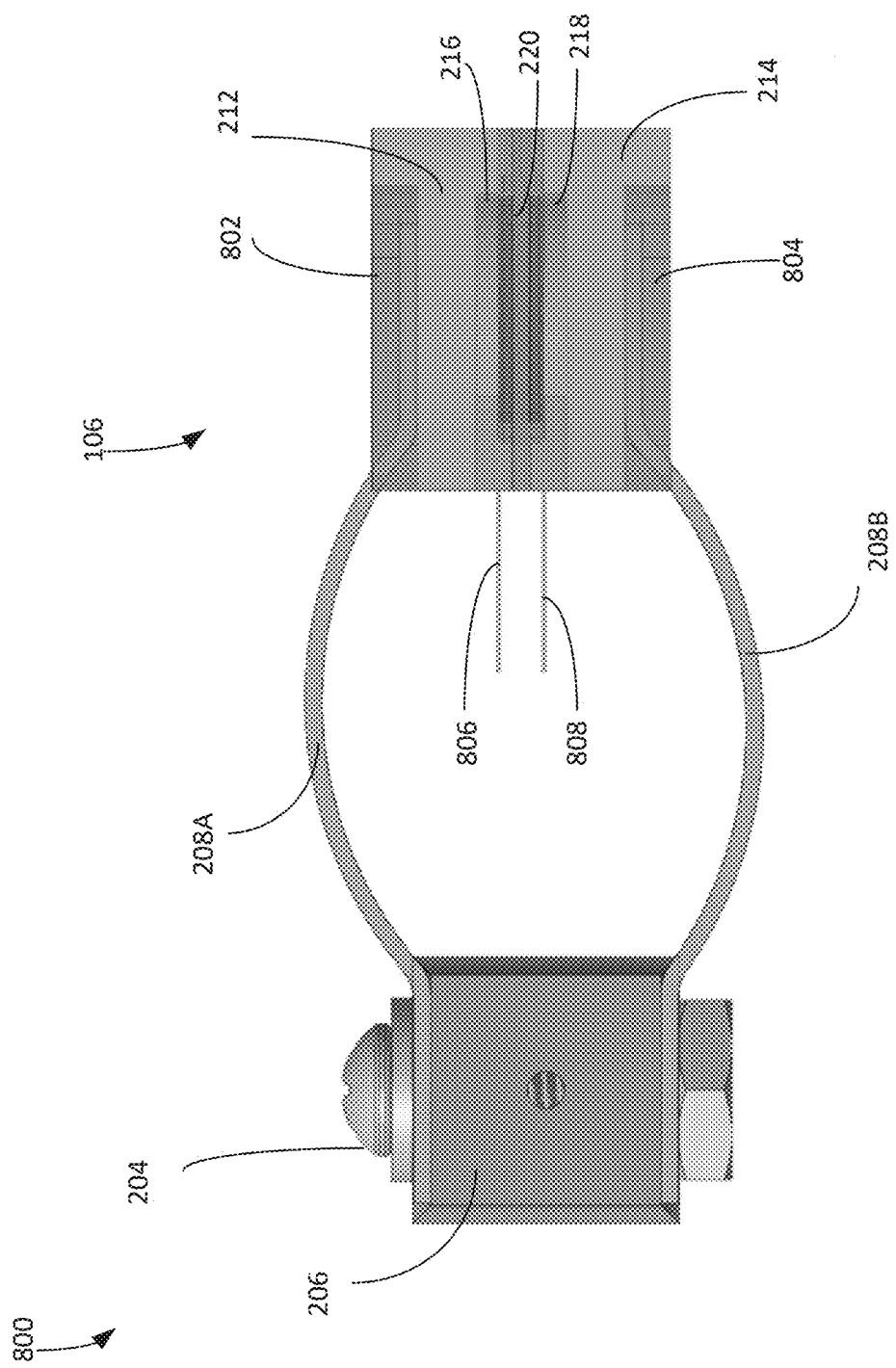
FIG. 8 depicts an isometric view of an exemplary mounting apparatus in which the intercalated complex is in a closed configuration, as described in one or more embodiments.

FIG. 8 depicts an isometric view of a mounting apparatus 800 in which the intercalated compound is in a minimum thickness state (i.e. a "closed" configuration). The mounting apparatus 800 operates similarly as described above with respect to FIG. 2 and the associated components as described with respect to FIGS. 3-7. In the embodiment shown in FIG. 8, mounting apparatus 800 is in a configuration in which the intercalated complex 106 takes a minimum thickness, and the spacing between the two covers 212, 214 is minimized.

When in the closed configuration, covers 212 and 214, facilitated by the spring forces of spring connectors 208A, 208B, tightly hold the sandwich of the planar heaters 216, 218 and the intercalated compound 220. This configuration occurs when most of the sourced atoms have been released into the surrounding environment of the enclosure 102, and the thickness of the intercalated compound 220 is minimized as a result. Even in this minimum thickness configuration, heating elements 216, 218 still receive power through electrical leads 806, 808 that electrically couple the heating elements 216, 218 to power supply 112.

Figure 9:
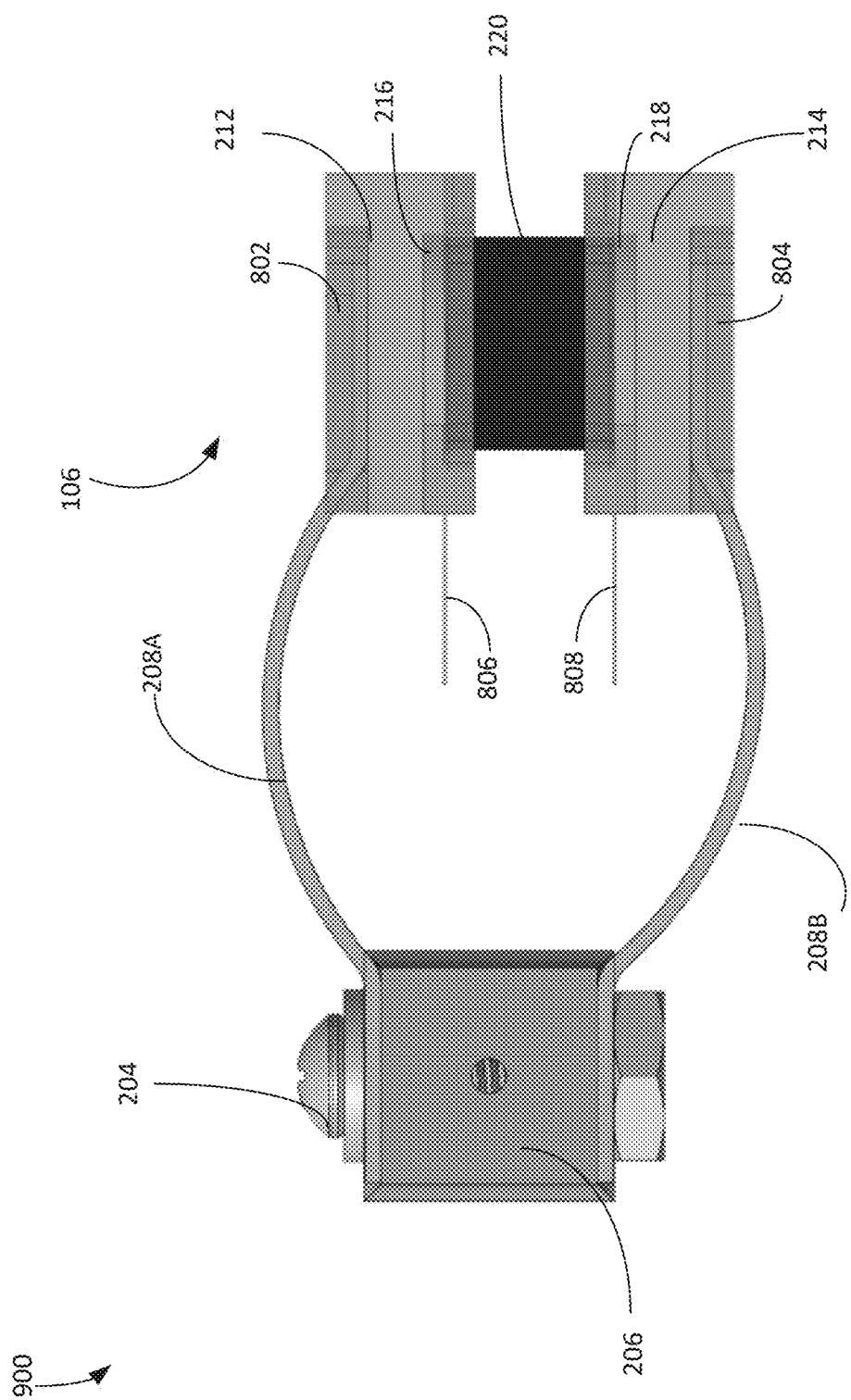
FIG. 9 depicts an isometric view of an exemplary mounting apparatus in which the intercalated complex is in an open configuration, as described in one or more embodiments.

FIG. 9 depicts an isometric view of a mounting apparatus 900 in which the intercalated compound is in a maximum thickness state (i.e. an "open" configuration). The mounting apparatus 900 operates similarly as described above with respect to FIG. 2 and the associated components as described with respect to FIGS. 3-7. In the embodiment shown in FIG. 9, mounting apparatus 900 is in a configuration in which the intercalated complex 106 is expanded and the spacing between the two covers 212, 214 takes a maximum value.

When in the open configuration, the thickness of the intercalated compound 220 is maximized due to a high concentration of sourced atoms intercalated into the intercalated compound 220. The increased thickness causes the intercalated compound 220 to push apart the covers 212, 214. In the open configuration, the intercalated complex 106 remains in mechanical equilibrium with the spring connectors 208A, 208B. Intercalated compound 220 remains coupled between covers 212, 214. In some embodiments, covers 212, 214 include specialized grooves or etches that prevent lateral shifting of the intercalated compound 220.

Referring to FIGS. 8-9 generally, the mounting apparatus 800, 900 is configured to change between the closed and open configurations. The expansion and contraction of the thickness of the intercalated complex 106 can be done in a continuous or gradual manner as the reaction equilibrium changes with respect to the bonding of the sourced atoms to the intercalated compound 220. Thus, the mounting apparatus 800, 900 can enable the intercalated complex 106 to expand or contract to any extent supported by the mounting apparatus 800, 900 between the open configuration (which corresponds to the state in which all or nearly all of the sourced atoms are within the intercalated compound 220) and the closed configuration (which corresponds to the state in which all or nearly all of the sourced atoms are absent from the intercalated compound 220). As reaction conditions change in the environment in which the mounting apparatus 800, 900 is disposed, the extent of expansion/contraction of the intercalated complex 106 will also change accordingly. For example, as more sourced atoms become intercalated into the intercalated compound 220, the intercalated complex can expand into the open configuration; and as fewer sourced atoms are intercalated into the intercalated compound 220, the intercalated complex 106 can contract into the closed configuration. Furthermore, the intercalated complex 106 can expand or contract into any intermediate state between these two configurations.

As shown in FIGS. 8-9, the intercalated complex (specifically, covers 212, 214) includes a respective notch 802, 804 fabricated at the top of the respective cover 212, 214. Each notch 802, 804 is configured to receive the end of the respective spring connector 208A, 208B, which snugly attaches the spring connector 208A, 208B to the respective cover 212, 214. Each notch 802, 804 may include other grooves or indentations that enable the end of the spring connector 208A, 208B to rest parallel to a longitudinal (i.e. horizontal) axis of the respective cover 212, 214. The coupling of the end of the spring connector 208A, 208B to the respective notch 802, 804 in this manner may also assist in generating suitable spring force in the spring connectors 208A, 208B by building tension in the arching of the spring connector 208A, 208B.

As previously noted, constructing and operating the mounting apparatus 800, 900 (in addition to any of the other mounting apparatus described herein) enables the intercalated complex 106 to have greater thermal and/or vibrational isolation from the environment that can disturb the complex 106. Intercalated complex 106 can remain substantially thermally isolated from the mount and walls, which can increase the power required to raise the intercalated compound 220 to desired operational temperatures. Additionally, vibrations experienced by the larger sensor system in which the source is utilized, can be absorbed by the flexible spring forces of the spring connectors 208A, 208B that hold the intercalated complex 106 in place.

Also, as previously noted, the operation of the mounting apparatus can be facilitated in a passive or active manner. When driven in an active manner, appropriate processing or control circuitry can be utilized to raise or lower the temperature of the compound 220 in response to signals from a sensor 108, so as to achieve a desired vapor density of sourced atoms. When operated in a passive manner, the temperature of the compound may be maintained at a fixed value.

Figure 10:
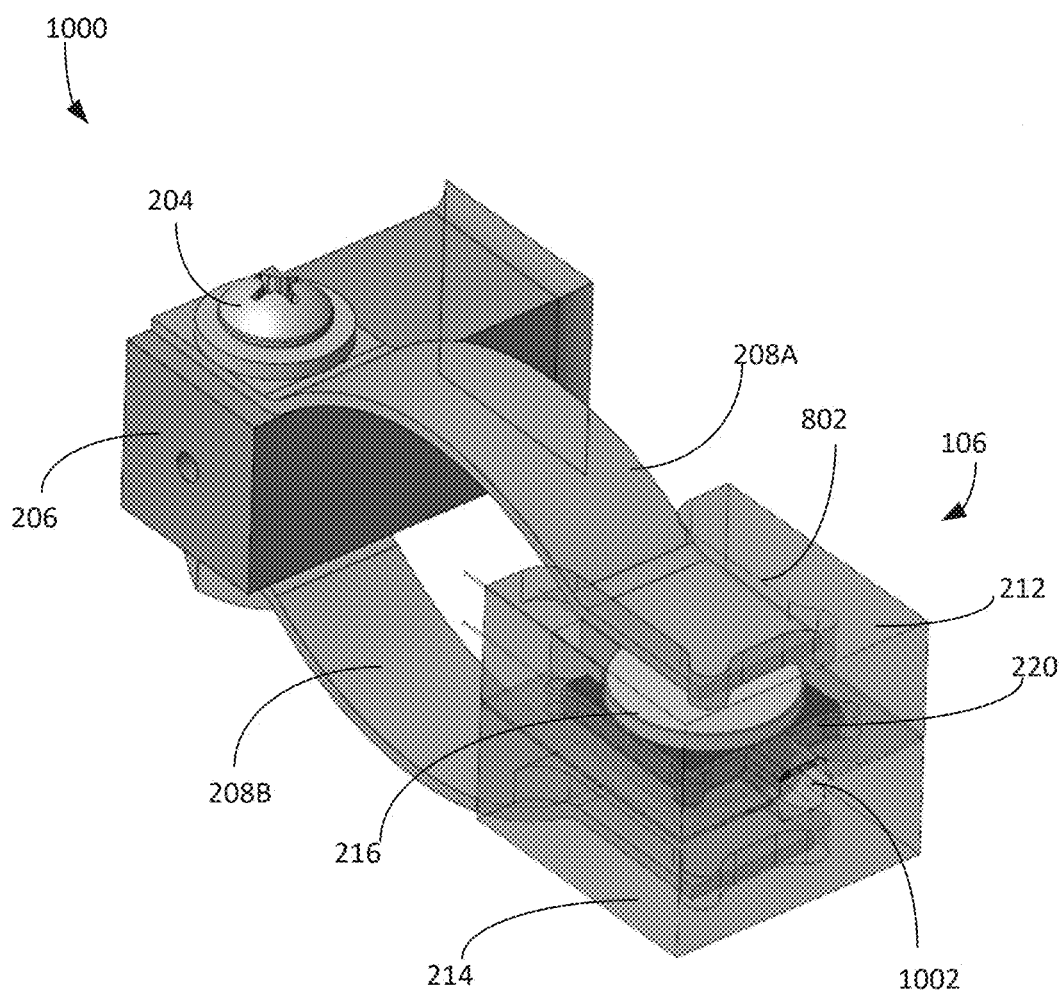
FIG. 10 depicts an isometric view of an exemplary mounting apparatus, as described in one or more embodiments.

FIG. 10 depicts an isometric view of a mounting apparatus 1000. Mounting apparatus 1000 operates similar to the other mounting apparatus shown and described with respect to FIGS. 1-9. In FIG. 10, the notch 802 of cover 212 is more readily shown. In some embodiments, the spatial dimensions of notch 802 (and notch 804) match the spatial dimensions of the end of the spring connector 208A (and spring connector 208B) that rest on the respective notch 802, 804. The spring connectors 208A, 208B remain disposed in the notches 802, 804 even as the intercalated complex 106 expands and compresses. FIG. 10 depicts intercalated complex 106 in a closed configuration, though the intercalated complex 106 is allowed to expand to a state as shown in FIG. 9.

Intercalated complex 106 also includes an opening 1002. Opening 1002 can be formed by fabricating a symmetric groove on each of the covers 212, 214 so that when the intercalated complex 106 compresses to the closed configuration, the opening 1002 enables environmental exposure to the intercalated compound 220 inside and between the two covers 212, 214. Doing so allows the sourced atoms to filter through the opening 1002 and interact with the intercalated compound 220 or release into the environment.

Figure 11:
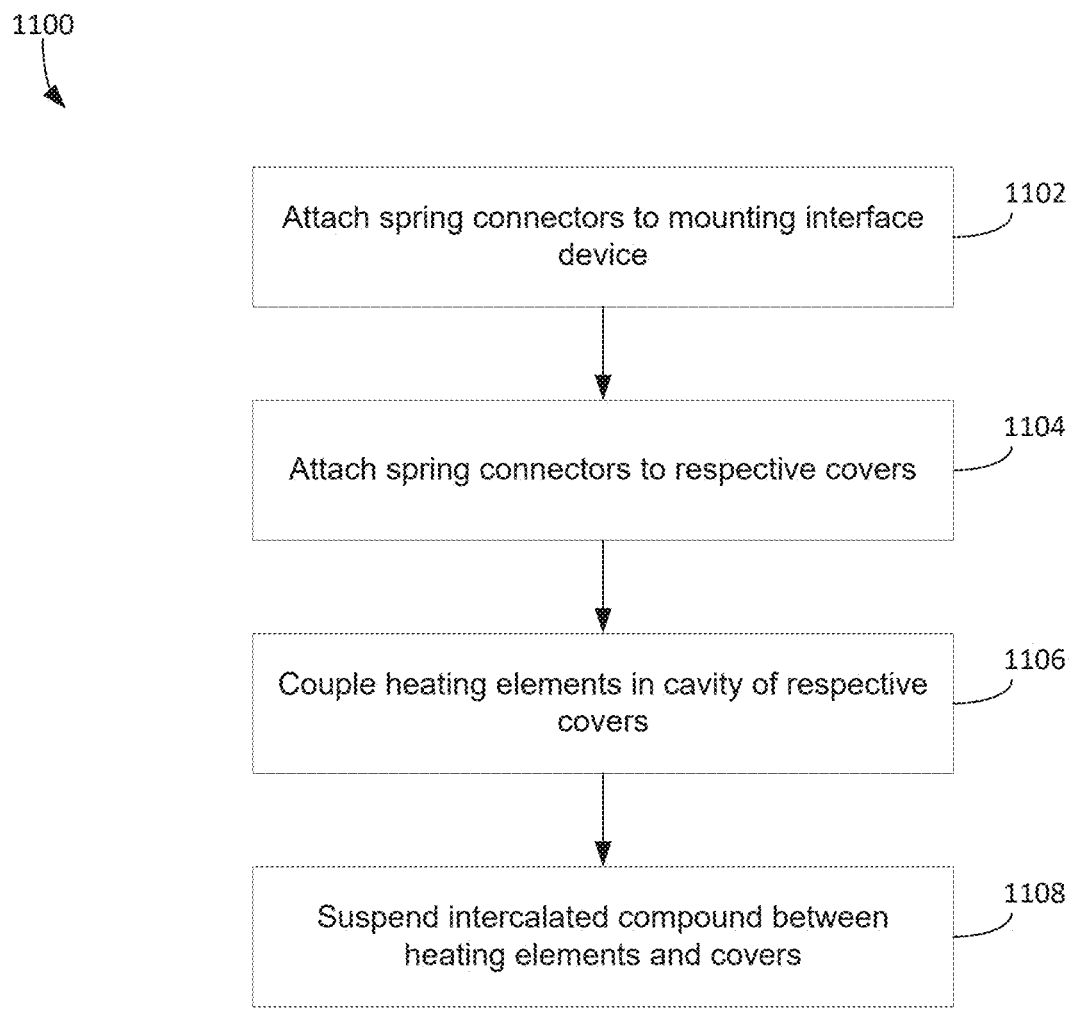
FIG. 11 depicts a flow diagram of an exemplary method for fabricating a mounting apparatus, as described in one or more embodiments.

FIG. 11 depicts a flow diagram of a method 1100 for fabricating a mounting apparatus. Method 1100 may be implemented via the techniques described with respect to FIGS. 1-10, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order.

Method 1100 includes attaching spring connectors to a mounting interface device at block 1102. The spring connectors can be coupled together to a coupler that attaches to a mounting interface device. For example, referring to FIGS. 2, 8-10, the coupler 206 is coupled to ends of the spring connectors 208A, 208B, by a screw 204 that is screwed through the holes 502 and into the interior of the coupler 206. Other devices such as bolts, nuts, or other devices can also be used to attach the spring connectors 208A, 208B to the coupler 206. In some embodiments, the spring connectors 208A, 208B are attached to the coupler 206 by other means, such as by distinctive grooves, etches, notches, or adhesive contact between the spring connectors 208A, 208B and the coupler 206.

At block 1104, method 1100 attaches the spring connectors to the respective covers of the intercalated complex. The spring connectors 208A, 208B can be connected to the covers 212, 214 as shown in FIG. 2 in which the hole 504 is inserted through the respective nub 210 of the respective cover 212, 214. In some embodiments, the spring connectors 208A, 208B are connected to the covers 212, 214 by locking the end of the spring connectors 208A, 208B in a respective notch 802, 804, as shown in FIG. 8-10. The spring connectors 208A, 208B can be coupled to the covers 212, 214 in other ways.

Proceeding to block 1106, method 1100 couples the heating elements in a cavity of the respective covers. For example, the heating elements can be coupled as shown in FIGS. 6A-7, by disposing the heating elements 216, 218 in the cavity 602 of each cover 212, 214. Method 1100 then proceeds to block 1108 and suspends an intercalated compound between the heating elements and the covers. The intercalated compound can be suspended as shown in FIGS. 2, 8-10, where it is allowed to expand and contract in the intercalated complex 106 as it reacts with sourced atoms. In some embodiments, the intercalated compound 220 is coupled between the heating elements 216, 218 and covers 212, 214 simply by the clamping spring force from the spring connectors 208A, 208B, that is, without any adhesive material or physical connecting devices so as to preserve the reactivity of the intercalated compound 220.

EXAMPLE EMBODIMENTS

Example 1 includes a system, comprising: a first cover; a first heating element physically coupled with the first cover; a second cover; a second heating element physically coupled with the second cover; an intercalated compound in contact with the first heating element and the second heating element and coupled in between the first cover and the second cover; a first spring connector coupled with the first cover at a first end of the first spring connector; a second spring connector coupled with the second cover at a first end of the second spring connector; a coupler attached to an exterior of a mounting interface device, wherein the coupler couples to both the first spring connector at a second end of the first spring connector and at a second end of the second spring connector, wherein the intercalated compound is suspended between the first cover and the second cover at least partially due to a spring force exerted by the first spring connector and the second spring connector, wherein the system transitions between a closed configuration and an open configuration, wherein in the closed configuration, the spring force exerted by the first spring connector and the second spring connector causes the first cover and the second cover to substantially enclose the intercalated compound, wherein in the open configuration, expansion of the intercalated compound exerts a force on the first spring connector and the second spring connector and causes increased exposure of the intercalated compound to an exterior environment relative to the closed configuration, wherein by suspending the intercalated compound, the intercalated compound is thermally insulated relative to the exterior environment.

Example 2 includes the system of Example 1, wherein the system is disposed in an enclosure, wherein the mounting interface device is attached to a wall of the enclosure.

Example 3 includes the system of Example 2, wherein the mounting interface device is electrically coupled to a power supply disposed outside of the enclosure, wherein the mounting interface device is configured to pass electrical signals from the power supply to the first and the second heating element.

Example 4 includes the system of any of Examples 2-3, comprising: a sensor disposed in the enclosure; and control electronics disposed outside the enclosure, wherein the sensor is configured to measure environmental parameters in the enclosure, and to provide the environmental parameters to the control electronics, wherein the control electronics is configured to control the configuration of the system based on the environmental parameters.

Example 5 includes the system of any of Examples 1-4, wherein the system transitions between the closed configuration and the open configuration in a passive manner.

Example 6 includes the system of any of Examples 1-5, wherein the first and the second spring connector are coupled to the mounting interface device by one or more screws, nuts, or bolts.

Example 7 includes the system of any of Examples 1-6, wherein the intercalated compound is a graphite intercalated compound.

Example 8 includes a device, comprising: an intercalated complex, comprising: a first cover, a first heating element physically coupled with the first cover, a second cover, a second heating element physically coupled with the second cover, an intercalated compound in contact with the first heating element and the second heating element and coupled in between the first cover and the second cover; and a mounting apparatus that physically couples to the intercalated complex, comprising: a first spring connector coupled with the first cover at a first end of the first spring connector, a second spring connector coupled with the second cover at a first end of the second spring connector, a coupler attached to an exterior of a mounting interface device, wherein the coupler couples to both the first spring connector at a second end of the first spring connector and at a second end of the second spring connector, wherein the intercalated compound is suspended between the first cover and the second cover at least partially due to a spring force exerted by the first spring connector and the second spring connector.

Example 9 includes the device of Example 8, wherein the intercalated compound is configured to expand when exposed to a vapor of sourced atoms, wherein the intercalated compound is configured to contract when the vapor of sourced atoms is emitted into a closed environment, wherein the intercalated compound remains suspended between the first cover and the second cover when expanded and when compressed.

Example 10 includes the device of any of Examples 8-9, wherein the first heating element and the second heating element receive power from one or more electrical leads coupled to a power supply.

Example 11 includes the device of any of Examples 8-10, wherein the first cover and the second cover include a respective notch, wherein the first end of the first spring connector is disposed in the respective notch of the first cover, wherein the first end of the second spring connector is disposed in the respective notch of the second cover.

Example 12 includes the device of any of Examples 8-11, wherein the first cover and the second cover form a cavity, wherein the intercalated compound is disposed in the cavity.

Example 13 includes the device of any of Examples 8-12, wherein the first cover and the second cover form an opening when the intercalated compound is in a compressed state, wherein a volume of sourced atoms is allowed to enter the opening and interact with the intercalated compound.

Example 14 includes the device of any of Examples 8-13, wherein the first cover and the second cover include a respective nub, wherein the first end of the first spring connector is coupled to the respective nub of the first cover, wherein the first end of the second spring connector is coupled to the respective nub of the second cover.

Example 15 includes the device of any of Examples 8-14, wherein the mounting interface device is coupled to an interior wall of an enclosure that houses the mounting apparatus, wherein the mounting apparatus is physically coupled to a mounting interface device on a side of the mounting apparatus, wherein the intercalated complex extends from the mounting interface device into an interior of the enclosure.

Example 16 includes the device of any of Examples 8-15, wherein the first spring connector and the second spring connector are longitudinal strips comprising an arched shape and composed of a flexible material.

Example 17 includes a method for fabricating a mounting apparatus for an intercalated compound, comprising: attaching a first end of a first spring connector and a first end of a second spring connector to a mounting interface device; attaching a second end of the first spring connector to a first cover; attaching a second end of the second spring connector to a second cover; coupling a first and a second heating element in a cavity formed by the first cover and the second cover; and suspending an intercalated compound between the first heating element and the second heating element and between the first cover and the second cover.

Example 18 includes the method of Example 17, wherein the first spring connector and the second spring connector are attached to the mounting interface device to exert an opposing spring force to the intercalated compound.

Example 19 includes the method of any of Examples 17-18, comprising attaching the mounting interface device to an interior wall of an enclosure, wherein the enclosure houses the mounting apparatus.

Example 20 includes the method of any of Examples 17-19, comprising: coupling the mounting interface device to an interior wall of an enclosure that houses the mounting apparatus; coupling the mounting apparatus on a side of a mounting interface device, wherein the intercalated compound extends from the mounting interface device into an interior of the enclosure.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   a first cover;
   a first heating element physically coupled with the first cover;
   a second cover;
   a second heating element physically coupled with the second cover;
   an intercalated compound in contact with the first heating element and the second heating element and coupled in between the first cover and the second cover;
   a first spring connector coupled with the first cover at a first end of the first spring connector;
   a second spring connector coupled with the second cover at a first end of the second spring connector;
   a coupler attached to an exterior of a mounting interface device, wherein the coupler couples to both the first spring connector at a second end of the first spring connector and at a second end of the second spring connector,
   wherein the intercalated compound is suspended between the first cover and the second cover at least partially due to a spring force exerted by the first spring connector and the second spring connector,
   wherein the system transitions between a closed configuration and an open configuration,
   wherein in the closed configuration, the spring force exerted by the first spring connector and the second spring connector causes the first cover and the second cover to substantially enclose the intercalated compound,
   wherein in the open configuration, expansion of the intercalated compound exerts a force on the first spring connector and the second spring connector and causes increased exposure of the intercalated compound to an exterior environment relative to the closed configuration,
   wherein by suspending the intercalated compound, the intercalated compound is thermally insulated relative to the exterior environment.

2. The system of claim 1, wherein the system is disposed in an enclosure, wherein the mounting interface device is attached to a wall of the enclosure.

3. The system of claim 2, wherein the mounting interface device is electrically coupled to a power supply disposed outside of the enclosure, wherein the mounting interface device is configured to pass electrical signals from the power supply to the first and the second heating element.

4. The system of claim 2, comprising:
   a sensor disposed in the enclosure; and
   control electronics disposed outside the enclosure,
   wherein the sensor is configured to measure environmental parameters in the enclosure, and to provide the environmental parameters to the control electronics,
   wherein the control electronics is configured to control the configuration of the system based on the environmental parameters.

5. The system of claim 1, wherein the system transitions between the closed configuration and the open configuration in a passive manner.

6. The system of claim 1, wherein the first and the second spring connector are coupled to the mounting interface device by one or more screws, nuts, or bolts.

7. The system of claim 1, wherein the intercalated compound is a graphite intercalated compound.

8. A device, comprising:
   an intercalated complex, comprising:
      a first cover,
      a first heating element physically coupled with the first cover,
      a second cover,
      a second heating element physically coupled with the second cover,
      an intercalated compound in contact with the first heating element and the second heating element and coupled in between the first cover and the second cover; and
   a mounting apparatus that physically couples to the intercalated complex, comprising:
      a first spring connector coupled with the first cover at a first end of the first spring connector,
      a second spring connector coupled with the second cover at a first end of the second spring connector,
      wherein the first spring connector and the second spring connector exert a spring force on the first cover and the second cover, respectively, a coupler attached to an exterior of a mounting interface device, wherein the coupler couples to both the first spring connector at a second end of the first spring connector and at a second end of the second spring connector, wherein the intercalated compound is suspended between the first cover and the second cover at least partially due to a spring force exerted by the first spring connector and the second spring connector.

9. The device of claim 8, wherein the intercalated compound is configured to expand when exposed to a vapor of sourced atoms, wherein the intercalated compound is configured to contract when the vapor of sourced atoms is emitted into a closed environment, wherein the intercalated compound remains suspended between the first cover and the second cover when expanded and when compressed.

10. The device of claim 8, wherein the first heating element and the second heating element receive power from one or more electrical leads coupled to a power supply.

11. The device of claim 8, wherein the first cover and the second cover include a respective notch, wherein the first end of the first spring connector is disposed in the respective notch of the first cover, wherein the first end of the second spring connector is disposed in the respective notch of the second cover.

12. The device of claim 8, wherein the first cover and the second cover form a cavity, wherein the intercalated compound is disposed in the cavity.

13. The device of claim 8, wherein the first cover and the second cover form an opening when the intercalated compound is in a compressed state, wherein a volume of sourced atoms is allowed to enter the opening and interact with the intercalated compound.

14. The device of claim 8, wherein the first cover and the second cover include a respective nub, wherein the first end of the first spring connector is coupled to the respective nub of the first cover, wherein the first end of the second spring connector is coupled to the respective nub of the second cover.

15. The device of claim 8, wherein the mounting interface device is coupled to an interior wall of an enclosure that houses the mounting apparatus, wherein the mounting apparatus is physically coupled to a mounting interface device on a side of the mounting apparatus, wherein the intercalated complex extends from the mounting interface device into an interior of the enclosure.

16. The device of claim 8, wherein the first spring connector and the second spring connector are longitudinal strips comprising an arched shape and composed of a flexible material.

17. A method for fabricating a mounting apparatus for an intercalated compound, comprising:

attaching a first end of a first spring connector and a first end of a second spring connector to a mounting interface device;

attaching a second end of the first spring connector to a first cover;

attaching a second end of the second spring connector to a second cover;

coupling a first and a second heating element in a cavity formed by the first cover and the second cover; and suspending an intercalated compound between the first heating element and the second heating element and between the first cover and the second cover at least partially due to a spring force exerted by the first spring connector and the second spring connector.

18. The method of claim 17, wherein the first spring connector and the second spring connector are attached to the mounting interface device to exert an opposing spring force to the intercalated compound.

19. The method of claim 17, comprising attaching the mounting interface device to an interior wall of an enclosure, wherein the enclosure houses the mounting apparatus.

20. The method of claim 17, comprising:

coupling the mounting interface device to an interior wall of an enclosure that houses the mounting apparatus;

coupling the mounting apparatus on a side of a mounting interface device, wherein the intercalated compound extends from the mounting interface device into an interior of the enclosure.

* * * * *